UNITED STATES PATENT OFFICE.

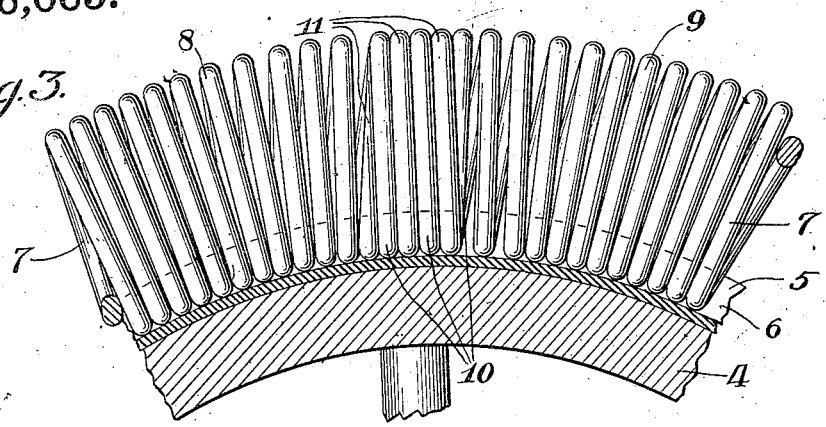
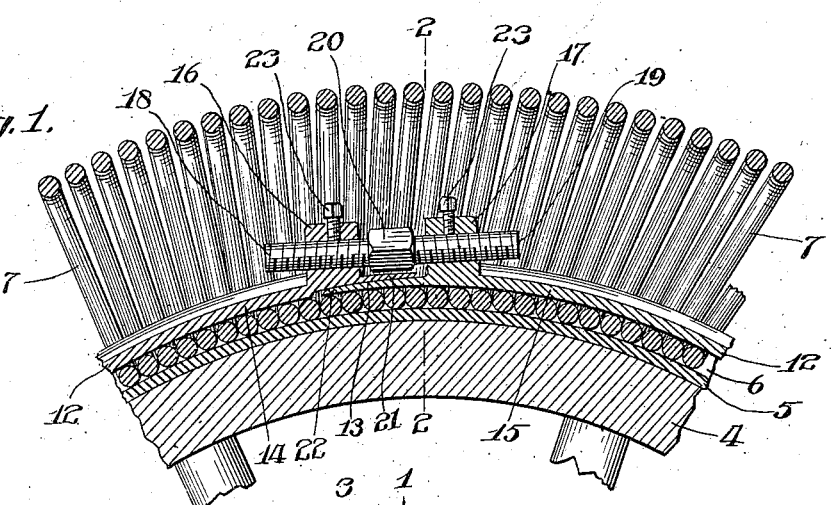
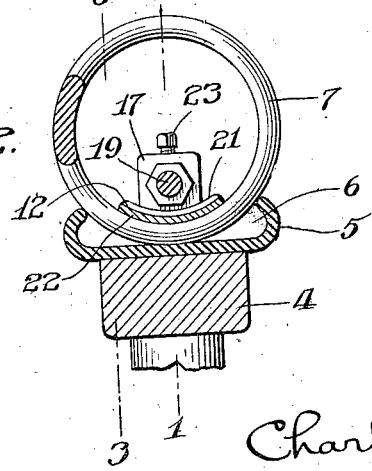

CHARLES W. BLANEY, OF PHILADELPHIA, PENNSYLVANIA, ASSIGNOR OF ONE-HALF TO CLARA BLANEY, OF PHILADELPHIA, PENNSYLVANIA.

VEHICLE-TIRE.

1,036,065.

Specification of Letters Patent. Patented Aug. 20, 1912.

Application filed February 27, 1911. Serial No. 610,992.

*To all whom it may concern:*

Be it known that I, CHARLES W. BLANEY, a citizen of the United States, residing at Philadelphia, in the county of Philadelphia and State of Pennsylvania, have invented certain new and useful Improvements in Vehicle-Tires, of which the following is a specification.

This invention relates to tires for vehicle wheels.

The object of the invention is to provide a tire of novel, simple and efficient construction formed of a helical spring. The further object of the invention is to provide a novel, simple and efficient means for securing the tire to the rim of vehicle wheel.

With this object in view, the invention consists in the novel construction and combination of parts hereinafter fully described and claimed.

In the drawings:—Figure 1 is a vertical section of my improved tire, on line 1—1 of Fig. 2, as applied to the rim of a vehicle wheel. Fig. 2 is a transverse vertical section of the tire on line 2—2 of Fig. 1. Fig. 3 is a vertical section, on line 3—3 of Fig. 2, showing the spring tire in elevation.

4 designates the felly of a vehicle wheel, and 5 a rim secured to the periphery thereof. The rim 5 is formed of metal and provided with a peripheral groove 6 therein, the rim 5 being in the form of the usual well known clencher rim to which pneumatic tires are applied. Surrounding the rim 5 and seated within the groove 6 therein is the tire 7 which is made in the form of a helical spring.

In Figs. 1 and 3 of the drawings but short sections of the tire 7 are shown, but it will be readily understood that the tire 7 as well as the rim 5 extends entirely around the wheel.

The spring tire has two end portions 8 and 9 and the normal condition of the tire 7 is straight when it is removed from the rim 5 and when its ends 8 and 9 are disengaged from each other. When the tire 7 is applied to the rim 5 it is bent into circular form bringing its two end portions 8 and 9 adjacent each other, as shown in Fig. 3. The end portions 8 and 9 are attached to each other by having the end convolution 10 of the end portion 8 inserted in the end convolutions 11 of the end portion 8. These convolutions are inserted into each other by giving the entire spring 7 a backward twist and then screwing, as it were, the convolutions into each other.

The entire spring tire 7 is secured to the rim 5 and maintained within the groove 6 thereof by a metal strap 12 which extends around the rim 5 within the spring 7 and engages with the inner portion of the spring. This strap 12 is split as at 13, providing two end portions 14 and 15. The end portion 14 is provided with a projection 16 and the end portion 15 is provided with a projection 17. Screwed into the projection 16 is one end 18 of a connecting bolt, and screwed into the projection 17 is the other end 19 of the connecting bolt. The end 18 of the connecting bolt is provided with a left-hand screw thread, and the end 19 of the connecting bolt is provided with a right-hand screw thread, and the central portion of the connecting bolt has a nut 20 formed thereon, whereby, by turning the nut 20 the two ends of the bolt will draw the ends of the strap 12 toward each other in a manner to firmly clamp the inner portions of the coils of the spring tire 7 within the groove 6 of the rim 5.

The ends of the strap 12 are provided with outer and inner overlapping portions 21 and 22, respectively. The inner face of the inner overlapping portion 22 is engaged with the inner portions of the coils of the spring 7, and the inner face of the outer overlapping portion 21 is engaged with the outer face of the inner overlapping portion 22; and, in addition to this, the inner overlapping portion 22 is made tapering, whereby when the two ends of the strap 12 are drawn toward each other by the connecting bolt the inner face of the inner overlapping portion 22 will be forced into engagement with the underlying inner portions of the coils of the spring 7. After the strap 12 has been tightened, the connecting bolt is secured in place, in a manner to prevent it from working loose, by suitable set screws 23 which are screwed into the projections 16 and 17 and engaged with the bolt, as shown.

In applying the tire to the wheel, the normally straight helical spring 7 is first bent into circular form, bringing its end portions adjacent to each other, and at the same time the strap 12 is inserted into the spring with one end of the connecting bolt screwed a short distance into one of the projections on the strap. This being done, the end convolutions of one end portion of the spring 7 are screwed into or inserted into the end convolutions of the other end portion of the spring 7, whereupon the connecting bolt is screwed into both projections 16 and 17 of the strap 12 to draw the ends of the strap together and thereby clamp the tire 7 within the groove 6 of the rim 5.

It will be readily understood that my improved tire may be readily attached to the ordinary well known clencher rim now commonly used in connection with clencher pneumatic tires. Thus my improved tire may be easily substituted for clencher pneumatic tires without changing the construction of the wheels.

I claim:

The combination of a wheel rim having a peripheral groove therein, a helical spring surrounding said rim and seated in said groove, said spring having the convolutions of one end thereof screwed into the spaces between the convolutions of the other end thereof, and means for retaining said spring within said groove.

In testimony whereof I affix my signature in presence of two witnesses.

CHARLES W. BLANEY.

Witnesses:
A. V. GROUPE,
G. P. SHARKEY.

---

Copies of this patent may be obtained for five cents each, by addressing the "Commissioner of Patents, Washington, D. C."